(12) United States Patent  (10) Patent No.: US 7,241,981 B2
Hofmann  (45) Date of Patent: Jul. 10, 2007

(54) SYSTEMS AND METHODS FOR DISPLAYING IMAGES AND PROCESSING WORK PIECES

(75) Inventor: Karsten Hofmann, Cincinnati, OH (US)

(73) Assignee: LAP Laser LLC, Cincinnati, OH (US)

( * ) Notice: Subject to any disclaimer, the term of this patent is extended or adjusted under 35 U.S.C. 154(b) by 196 days.

(21) Appl. No.: 11/073,961

(22) Filed: Mar. 7, 2005

(65) Prior Publication Data

US 2006/0016957 A1  Jan. 26, 2006

Related U.S. Application Data

(60) Provisional application No. 60/550,670, filed on Mar. 5, 2004.

(51) Int. Cl.
*G01J 1/20* (2006.01)
*H01L 27/00* (2006.01)

(52) U.S. Cl. .................. 250/201.1; 353/28; 353/122

(58) Field of Classification Search ............. 250/201.1; 353/28, 122
See application file for complete search history.

(56) References Cited

U.S. PATENT DOCUMENTS

| 2,506,076 A | 5/1950 | Garrison |
|---|---|---|
| 2,543,561 A | 2/1951 | Tracy |
| 3,053,144 A | 9/1962 | Harries et al. |
| 3,377,915 A | 4/1968 | Buckett |
| 3,749,485 A | 7/1973 | Carter et al. |
| 4,520,261 A | 5/1985 | Tsutsumi |
| 4,532,402 A | 7/1985 | Overbeck |
| 4,590,654 A | 5/1986 | Kajiura |
| 4,618,759 A | 10/1986 | Müller et al. |
| 4,713,537 A | 12/1987 | Kunz et al. |
| 4,739,487 A | 4/1988 | Bonnet et al. |
| 4,814,800 A | 3/1989 | Lavinsky et al. |
| 4,883,352 A * | 11/1989 | Bruning ................ 353/122 |
| 4,918,284 A | 4/1990 | Weisz |
| 4,941,082 A | 7/1990 | Pailthorp et al. |
| 5,011,282 A | 4/1991 | Ream et al. |
| 5,124,524 A | 6/1992 | Schuster et al. |
| 5,171,963 A | 12/1992 | Saruta et al. |
| 5,195,451 A | 3/1993 | Nakashima |
| 5,341,183 A | 8/1994 | Dorsey-Palmateer |
| 5,381,258 A | 1/1995 | Bordignon et al. |

(Continued)

FOREIGN PATENT DOCUMENTS

SU  640337  12/1978

OTHER PUBLICATIONS

"Photo-Top" web page, Green Mesa Metrology, Inc., web site, www.greenmesa.com/gICM.htm, retrieved and printed Feb. 12, 2004 © 2002.

"The New Matrix Sebring" web page, Matrix Stone Products, web site, www.matrixstoneproducts.com/Sebring.html, retrieved and printed Mar. 1, 2004.

(Continued)

*Primary Examiner*—John R. Lee
(74) *Attorney, Agent, or Firm*—Dinsmore & Shohl LLP

(57) ABSTRACT

A method of displaying an image on a work piece positioned on a movable work surface. A method of processing a work piece, as well as a method of displaying an image on a moveable work surface, is also provided. A system for machining a work piece in accordance with one or more images projected onto the work piece is also provided.

4 Claims, 3 Drawing Sheets

U.S. PATENT DOCUMENTS

| | | | |
|---|---|---|---|
| 5,388,318 A | | 2/1995 | Petta |
| 5,400,132 A | | 3/1995 | Trepagnier |
| 5,430,662 A | | 7/1995 | Ahonen |
| 5,444,505 A | | 8/1995 | Dorsey-Palmateer |
| 5,450,147 A | | 9/1995 | Dorsey-Palmateer |
| 5,482,026 A | | 1/1996 | Russell |
| 5,506,641 A | | 4/1996 | Dorsey-Palmateer |
| 5,588,216 A | | 12/1996 | Rank et al. |
| 5,646,859 A | | 7/1997 | Petta et al. |
| 5,651,600 A | | 7/1997 | Dorsey-Palmateer |
| 5,663,795 A | | 9/1997 | Rueb |
| 5,671,053 A | * | 9/1997 | Wigg et al. ............ 356/620 |
| 5,757,647 A | | 5/1998 | DeMichele |
| 6,000,801 A | | 12/1999 | Dillon et al. |
| 6,006,735 A | | 12/1999 | Schlough et al. |
| 6,170,163 B1 | | 1/2001 | Bordignon et al. |
| 6,317,980 B2 | | 11/2001 | Buck |
| 6,547,397 B1 | * | 4/2003 | Kaufman et al. ............ 353/28 |
| 6,639,175 B2 | | 10/2003 | Rohleder et al. |
| 6,935,748 B2 | * | 8/2005 | Kaufman et al. ............ 353/28 |
| 2002/0059177 A1 | | 5/2002 | Hansen |
| 2002/0179865 A1 | * | 12/2002 | Joffe ............ 250/559.29 |
| 2003/0137510 A1 | | 7/2003 | Massen |

OTHER PUBLICATIONS

"Finally 'World Class' Stone Machining Technology from a TOP American Machine Tool Manufacturer," web page, Northwood Machine Manufacturing Company, web site, http://216.26.161.140/nwd/stone_machining_centers.asp, retrieved and printed Mar. 5, 2004.

Photograph of "Space" rotary saw table, web page, http://www.vicintl.com/img/denver/space.jpg, retrieved and printed Mar. 1, 2004.

INcounters PhotoTop brochure, "From Photograph to Countertop," product of Green Mesa, Inc., Abilene, TX.

"General Scanning and Lumonics Agree to Merge," web page, Photonics.com, web page, http://www.photonics.com/spectra/business/XQ/ASP/businessid.281/QX/read.htm, retrieved and printed Feb. 12, 2004.

esp@cenet database printout for Russian Publication No. SU640337, "Device for Visual Displaying of Information," Inventor: Erik S. Kozlov, Publication Date: Dec. 30, 1978, web page, v3.espacenet.com/textdoc?DB=EPODOC&IDX=SU640337&F=0&QPN=SU640337, retrieved and printed Aug. 25, 2006.

* cited by examiner

SYSTEMS AND METHODS FOR DISPLAYING IMAGES AND PROCESSING WORK PIECES

CROSS-REFERENCES TO RELATED APPLICATIONS

This Application claims the benefit under 35 U.S.C. § 119 of U.S. Provisional Application Ser. No. 60/550,670, filed Mar. 5, 2004, which is incorporated herein by way of reference.

FIELD OF THE INVENTION

The present invention relates to systems and methods for displaying images on a work piece or work surface, as well as systems and methods for processing work pieces using displayed image(s) as a guide. In one particular embodiment, the present invention provides systems and methods for displaying a pattern(s) on a work piece using a laser projector, and using the displayed pattern(s) as guide for processing the work piece (e.g., cutting a stone slab using the pattern(s) as a cutting guide or template).

BACKGROUND OF THE INVENTION

Many materials must be cut in accordance with one or more predetermined patterns. In order to cut these materials, the pattern is typically transferred to the material in a variety of manners. In some instance, the pattern may simply be traced onto the material by hand, and thereafter the material cut in accordance with the transferred pattern. Such a process is time consuming, and may lead to inefficient use of material.

SUMMARY OF THE INVENTION

The present invention provides a method of displaying an image on a work piece positioned on a movable work surface, comprising the steps of:
(a) providing a digital representation of an image and a laser projection system configured to project the image based on the digital representation;
(b) providing a work piece positioned on a movable work surface;
(c) projecting the image from the laser projection system onto the work piece at a selected image location on the work piece;
(d) moving the work surface, with the work piece supported by the work surface;
(e) sensing the movement of the work surface and transmitting to the laser projection system a feedback signal indicative of the movement; and
(f) moving the projected image in response to the feedback signal such that the image is projected on the work piece at the selected image location.

Another embodiment of the present invention provides a method of processing a work piece, comprising the steps of:
(a) projecting an image onto a work piece to be processed;
(b) moving at least one of the image and the work piece until the image is positioned at a desired location on the work piece;
(c) locking the image and the work piece such that, as the work piece is moved, the image will remain at the desired location; and
(d) processing the work piece using the image as a guide.

By way of example, processing of the work piece may comprise machining (e.g., cutting) the work piece using the projected image as a template or guide, thereby cutting a product from the work piece where the shape of the product corresponds to the image which was projected onto the work piece. In one particular example, a countertop may be cut from a stone slab or other suitable material, using, for example, a saw or a CNC router (or other cutting device).

In another embodiment, the present invention provides a method of displaying an image on a moveable work surface, comprising:
(a) providing a digital representation of an image and a laser projection system configured to project the image based on the digital representation;
(b) providing a movable work surface;
(c) projecting the image from the laser projection system onto the work surface at a selected image location on the work surface;
(d) moving the work surface;
(e) sensing the movement of the work surface and transmitting to the laser projection system a feedback signal indicative of the movement; and
(f) moving the projected image in response to the feedback signal such that the image is projected on the work surface at the selected image location.

In one particular embodiment, this method may be used to assemble items (e.g., work pieces) onto the work surface, using the projected image as a template which guides placement of the items.

Yet another embodiment of the present invention is a system for machining (e.g., cutting) a work piece in accordance with at least one image projected onto the work piece, comprising:
(a) a processing machine having a moveable work surface configured for supporting a work piece thereon, the processing machine configured for machining (e.g., cutting) a work piece supported on the work surface;
(b) an optical projection system for projecting at least one image onto a work piece supported by the work surface, the optical projection system including an optical projector and a control system;
(c) at least one sensor for sensing movement of the work surface, wherein the at least one sensor is configured to provide a signal to the control system indicative of movement of the work surface;

wherein the optical projection system is configured such that an image projected onto a work piece will be projected in the same location on the work piece when the work surface is moved.

BRIEF DESCRIPTION OF THE DRAWINGS

The following detailed description will be more fully understood in view of the drawing in which.

Figure 1:
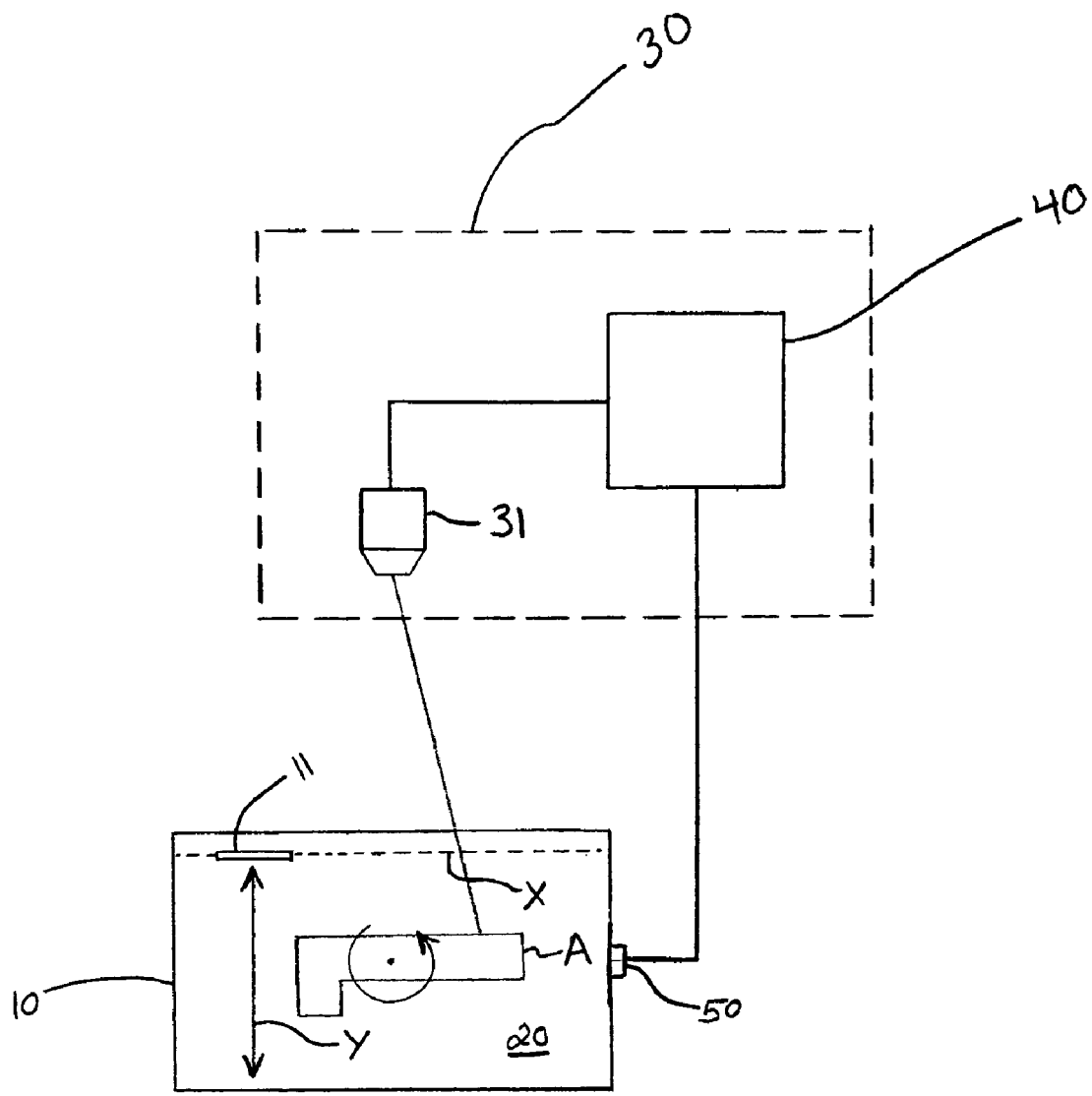
FIG. 1 is a schematic illustration of one embodiment of the present invention.

The embodiments set forth in the drawing are illustrative in nature and are not intended to be limiting of the invention defined by the claims. Moreover, individual features of the drawing and the invention will be more fully apparent and understood in view of the detailed description.

DETAILED DESCRIPTION

The present invention is directed to systems and methods for displaying images on a work piece or work surface using, for example, a laser projection system. The present invention also provides systems and methods for processing and/or assembling work pieces using the displayed images as a guide (e.g., as a template). By way of example, the displayed image may comprise a pattern defining the outline of structure to be machined (e.g., cut) from the work piece. While the following detailed description and accompanying drawings depict exemplary embodiments which may be used for cutting stone and similar materials, the scope of the present invention is not so limited.

FIG. 1 is a schematic illustration of one exemplary embodiment of the present invention. The system of FIG. 1 comprises a work piece processing machine 10, a tool 11 associated with the processing machine for processing the work piece, and an optical projection system 30. Optical projection system 30 includes an optical projector 31, and a control system 40 for controlling the projection of images onto a work piece by optical projector 31. Processing machine 10 includes a work surface 20 configured for supporting a work piece thereon. In some embodiments of the present invention, processing tool 11 is configured for machining a work piece, such as by cutting. By way of example, tool 11 may comprise a saw blade or a router bit. Thus, processing machine 10 may comprise, for example, a gantry saw or a CNC router.

In the embodiment of FIG. 1, processing machine 10 and processing tool 11 are configured such that tool 11 may be moved in at least two directions, namely the X and Y directions, as indicated. In the case of, for example, a gantry saw, saw blade 11 may be linearly moved in the X direction in order to make a straight line cut in a work piece. Since a gantry saw typically only provides a linear cut, saw blade 11 can be moved in the Y direction only when the blade is disengaged (e.g., raised above) the work piece. For a device such as a CNC router, on the other hand, the router bit may typically be moved in both the X and Y directions during cutting, thereby providing both straight line and curvilinear machining of a work piece. Work surface 20, such as the table of a gantry saw, may also be moveable. In the embodiment shown in FIG. 1, work surface 20 may be rotated about a central axis in order to position a work piece at the desired location with respect to tool 11.

As also seen in the exemplary embodiment of FIG. 1, laser projector 31 (sometimes referred to as a laser pattern projector), in response to instructions received from control system 40, will project an image A on the surface of a work piece supported by work surface 20. Image A may comprise, for example, an outline of a structure to be machined from a work piece, such as a countertop to be cut from a stone slab. As more fully described below, an operator may relocate image A to any desired location and orientation on a work piece supported by work surface 20. In some embodiments of the present invention, the image may be "locked" in position with respect to the work piece such that when work surface 20 is moved (e.g., rotated) the image will be displayed in the same location on the work piece.

The system of FIG. 1 may include one or more means for sensing movement of work surface 20 and/or a work piece supported by work surface 20, such as one or more sensors 50 which provide feedback signals to control system 40 indicative of such movement. Embodiments of the present invention also can be configured to provide visible and/or audible indicia whenever portions of the displayed image are in a predetermined alignment with respect to the processing machine. For example, such indicia may be provided to an operator whenever a portion of a displayed image, such as a line segment of an outline displayed on a work piece, is aligned with the processing direction of tool 11 (such as the linear cutting direction X of a saw blade).

The system depicted in FIG. 1 is particularly useful for processing (e.g., machining) sheet-like materials, such as the cutting of a stone slab. The stone slab can comprise any of a variety of stone materials, such as granite or marble. Alternatively, the system may be used for cutting other natural or man-made sheet-like materials. By way of example, the system of FIG. 1 can be used for the cutting of countertops and the like from a stone slab or other natural or man-made sheet-like material.

Figure 2:
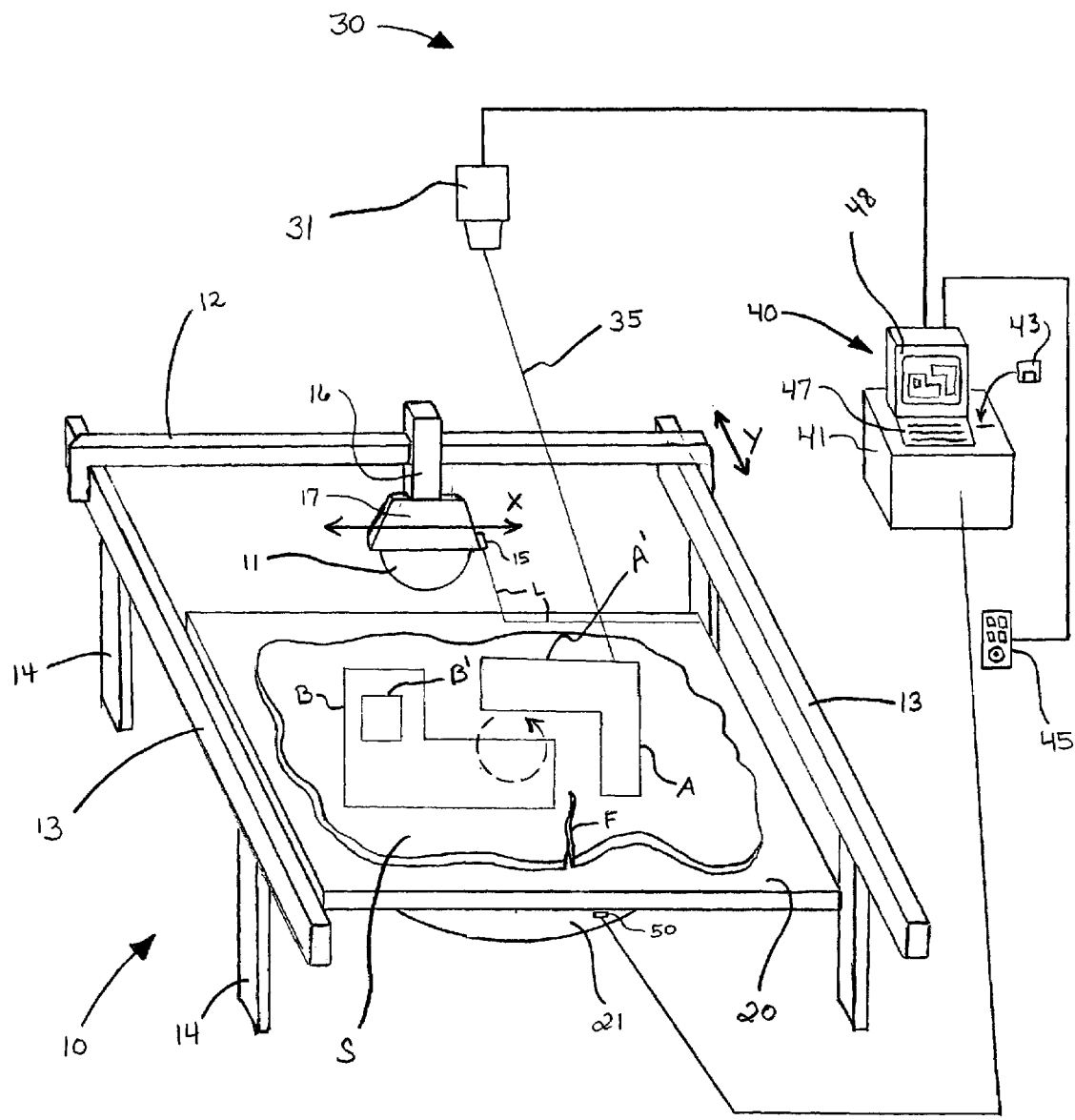
FIG. 2 is a more detailed illustration of one embodiment of the present invention.

In the more detailed exemplary embodiment of FIG. 2, the exemplary processing machine is a gantry saw 10 configured to make straight line cuts in a work piece, such as a stone slabs, supported by work surface 20. Gantry saw 10 generally includes a frame (i.e., a "gantry") comprising a pair of spaced-apart transverse beams 13, supported, for example, by columns 14. These transverse beams 13 and support columns 14 are often referred to as the gantry bridge. A moveable beam, or saw bridge, 12 extends between transverse beams 13 and is moveably supported thereon. A saw blade support 16 is moveably supported by saw bridge 12, and a saw blade 11 is located at the lower end of saw blade support 16, as shown. A protective housing 17 for saw blade 11 is also shown.

As is known to those skilled in the art, saw blade 11 is supported by saw bridge 12 (via support 16) such that saw blade 11 may travel back and forth along saw bridge 12 in a linear fashion for purposes of cutting a work piece (designated herein as movement in the "X" direction, as indicated in FIG. 2). In other words, the linear cutting direction of saw blade 11 is parallel to the X-axis of the arbitrary coordinate system used herein for purposes of description. Although not depicted in FIG. 2, saw blade support 16 is configured such that saw blade 11 may be lowered and raised (movement in the "Z" direction) in order to permit the saw blade to be lowered into contact with a work piece for purposes of cutting the work piece. Saw bridge 12 is moveably supported by transverse beams 14 such that saw bridge 12 may travel along transverse beams 13 as shown (defined herein as movement in the "Y" direction). In a typical gantry saw, actuation of the saw blade 11 (i.e., rotation of the blade for purposes of cutting), movement of the saw blade along saw bridge 13 in the X direction, and movement of the saw bridge along the transverse beams 14 in the Y direction are electronically controlled by an operator by means of, for example, a control panel attached to the gantry saw and/or a handheld remote control unit.

Conventional gantry saws also include a work surface 20 (often referred to as the saw table) located between transverse beams 13, typically at a height lower than the height of the transverse beams. Work surface (or table) 20 is configured to support sheet-like materials, such as stone slab S (or other work piece), on its upper surface, and is moveably supported by a base 21. Most tables on gantry saws are rotatably supported by a base structure, and some are configured such that the table may be tilted in one or more directions. Such tilting allows for the work piece to be easily loaded and cut at various angles, as desired.

The above-described components of gantry saw 10 are conventional in nature, and such saws are used today for cutting sheet-like materials, such as cutting stone slabs into countertops and the like. In the conventional method of using gantry saw 10, a physical template of the countertop or other desired product shape is typically produced from a solid sheet (e.g., from a wood or cardboard sheet). This template is then used to physically mark the outline of the countertop on the stone slab.

Once the outline of the countertop has been marked on the stone slab, the countertop is cut from the stone using saw blade 11, with the marked outline acting as a cutting guide. In order to accomplish this, table 20 is rotated (either manually or via motorized rotation) until one of the line segments of the countertop outline (i.e., one edge of the countertop) is aligned with the linear cutting path of saw blade 11. In other words, the table is rotated until an edge of the countertop outline, a line segment of the marked outline, is positioned parallel to the X-axis depicted in FIG. 2. While such alignment is typically accomplished visually, some gantry saws include a line laser device 15 aligned with the saw blade 11. In FIG. 2, line laser device 15 is attached to the housing 17 for saw blade 11. Line laser device 15 will project a laser line (L) on the surface of table 20 and stone slab S, wherein laser line L corresponds to the linear cutting path of saw blade 11.

Continuing with the description of the conventional use of a gantry saw, once the operator visually perceives that a line segment forming the outline of a countertop, such as line segment A' in FIG. 2, is positioned parallel to the cutting line of saw blade 11, the operator will then advance the saw bridge along transverse beams 13 (i.e., in the Y-direction) until saw blade 11 is aligned with the line segment of the countertop outline (i.e., the cutting line of the saw blade is not only parallel with the line segment of the outline but also is co-extensive therewith). Laser line L assists with this alignment process, in that the operator must merely ensure that laser line L is parallel to the line segment and is projected on top of the line segment marked on the work piece. However, since this alignment process is performed visually, it is unlikely that the line segment and saw blade will be precisely aligned once the saw bridge is advanced into position. Therefore, the process of rotating table 20 and moving saw bridge 12 along transverse beams 13 will continue, typically over several iterations, until saw blade 11 is precisely aligned with the line segment of the countertop outline marked on the stone slab. While line laser device 15 will assist in this alignment process, it is still tedious and time-consuming.

Once saw blade 11 has been precisely aligned with the desired line segment, the saw is turned on, the spinning saw blade 11 is lowered into the slab, and saw blade 11 is advanced along saw bridge 12 (in the X direction) in order to complete the cut along the line segment of the marked countertop outline. Thereafter, the entire process is repeated for each and every line segment of the countertop outline until the countertop has been completely cut from the slab. While a simple rectangular countertop will require only four cuts, many countertops have much more complex shapes and require many more cuts. In addition, since two or more countertops are often cut from each stone slab, it is time consuming to process a single stone slab. In addition, the use of physical templates to mark the stone slab is itself tedious, and often results in less than optimal use of an entire stone slab.

The systems and methods of the present invention offer various improvements over the currently-employed methods described above. While several problems and drawbacks associated with the current methods have been described, the present invention is not limited to systems and methods which solve each and every one of these problems or drawbacks. In other words, some embodiments of the present invention do not necessarily include each and every feature or aspect described herein.

With respect to the cutting or machining of stone slabs and the like, various embodiments of the systems and methods according to the present invention provide one or more benefits. These benefits may include, for example, eliminating the need to physically mark the outline of the final product (e.g., a countertop) on the stone slab, simplifying the layout of one or more countertops on a single slab, and improving the alignment of the saw blade with the line segments forming the outline of the countertop (in terms of precision and/or speed). In the embodiment of FIG. 2, a system according to one embodiment of the present invention includes a laser projection system 30 generally comprising a laser projector 31 mounted above table 20 and a control system 40 configured to control the display of one or more images on the work piece in accordance with one or more control programs stored in memory (e.g., software). Control system 40 is also configured to control the display of images in response to user input, image data representative of the image to be displayed on the work piece, and/or feedback signals received from other components of the laser projection system.

In the exemplary embodiment of FIG. 2, control system 40 includes a computer system 41. Computer system 41 may comprise any device which is capable of processing data in accordance with one or more instructions. Computer system 41 generally includes one or more processors (e.g., a CPU), as well as memory (typically both RAM and ROM) for storing data (e.g., image and/or calibration data) and control programs (e.g., software) for performing the various functions described herein. As used herein, the term "computer system" is to be given its broadest possible interpretation. Examples include a personal computer (including desktop, laptop, notebook, tablet or handheld personal computer), workstation, server, mainframe, embedded system, microprocessor, discrete logic system, and the like. Computer system 41 may also comprise any number of computers or individual processors, such as application specific integrated circuits (ASICs).

Computer system 41 may be configured to process image data representative of the image(s) to be displayed on the work piece, and to generate, for example, control signals (or instructions) which are transmitted to laser projector 31. Such control signals may comprise, for example, the coordinates of an image(s), such as a countertop outline, to be projected by the laser projector 31 onto the work piece. Laser projector 31 will then display an image(s) on the work piece in accordance with the control signals received from computer system 41. It should be noted that computer system 41 need not be physically separate from laser projector 31, since these components of laser projection system 30 may be physically combined with one another. In addition, control system 40 (e.g., a computer system 41) may also be incorporated into or combined with a control system for the processing machine itself (such as the computer control system of a CNC router).

Computer system 41 may include one or more input devices operable to allow a user to input information (such as instructions) into computer system 41. For example, FIG. 2 depicts a keyboard 47 and a handheld input device 45. However, various other input devices may be used, either alone or in combination with one another, including, for example, a keypad, mouse, voice recognition system, joystick, trackball, or any other suitable data input device.

Computer system 41 may also include image processing software which processes image data representative of image(s) to be displayed on a work piece (e.g., countertop outlines A and B on stone slab S in FIG. 2). The specific embodiment of the image processing software is dependent upon the embodiment of the laser projection system 30, and in particular, the various features provided in each such embodiment. The image processing software may even be embodied as hardware, such as an ASIC. The image processing software generates control signals which are then communicated to laser projector 31, and optionally one or more display devices (as described below). For example, the image processing software may process a CAD file containing data representative of a countertop outline, and transmit image coordinate data to laser projector 31. Computer system 41 may also include one or more display devices, such as a monitor 48. In this manner, the image(s) to be projected by laser projector 31 may also be displayed on monitor 48.

Laser projector 31 generally comprises a device configured to emit one or more laser beams for projecting an image onto a surface (such as stone slab S shown in FIG. 2). Typically, such a device comprises one or more scanning laser projectors which emit a laser beam which appears as an illuminated dot at the point on a surface which the beam strikes. However, the scanning laser projector is configured to rapidly move the laser beam (typically by means of one or more rapidly pivoting mirrors which steer the laser beam) such that the eye perceives an image formed by the path traced by the laser beam. Laser projector 31 may be configured to project images (i.e., trace an outline on a work piece) in more than one color. In addition, it is also contemplated that more than one laser projector 31 may be used, such as to project images on the work piece (such as the stone slab) in two or more colors. By way of example, laser projector 31 may comprise a Cad-Pro 2d™ or Cad-Pro 3d™ laser projector available from LAP Laser in Cincinnati, Ohio.

As mentioned previously, control system 40 (such as computer system 41) is in communication with laser projector 31, and transmits control signals (instructions) to the projector indicative of the image(s) to be displayed on the work piece. For example, these control signals may comprise image coordinates which are then used by laser projector 31 to project the appropriate image on the work piece (such as the outline of one or more countertops). Once the outline of the countertop is projected on the work piece, such as stone slab S in FIG. 2, the operator may simply mark the outline of the countertop using the laser projected image as a guide. Thereafter, the countertop may be cut from the stone slab in the manner described previously. Such a process eliminates the need for creating a physical template for marking the outline on the stone slab. However, additional aspects of embodiments of the present invention eliminate the need for marking the countertop outline on the stone slab. In particular, the laser image(s) projected on the stone slab may be directly used as a template to guide the cutting operation.

Computer system 41 may generate the control signals sent to laser projector 31 in any of a variety of manners. For example, computer system 41 may include an image data conversion program (e.g., software) which converts image data (such as a CAD file or other graphics file) into the appropriate control signals for instructing laser projector 31 to project the image onto a work piece. Computer system 41 may also include a simple drawing program which an operator may use to "draw" the outline of a countertop using a mouse, a keyboard or any of a variety of input devices. Such a drawing program generates a digital representation of an image, such as the outline of a countertop, which may be stored as a graphics file in any of a variety of formats. The digital representation of the image will typically comprise a graphics file having data representative of the image, such as the various dimensions of the countertop or other product. An image date conversion program may then convert that image data into appropriate control signals which instruct laser projector 31 to project the image on the work piece. These control signals (or instructions) are then transmitted to laser projector 31 (e.g., through a wired or wireless connection).

Computer system 41 may also include more sophisticated graphics programs, such as a computer aided design (CAD) program, by which a user may generate data representative of the image to be displayed on the work piece. A CAD program may be particularly advantageous in that it can generate the dimensions of the image to be displayed on the work piece, such as the dimensions of a countertop to be cut from a stone slab (including the thickness). The image data conversion program will then generate the appropriate control signals based upon one or more CAD files (i.e., files comprising digital representations of one or more images to be displayed on the work piece).

Alternatively, the image to be projected on the work piece, such as the outline of one or more countertops, may be prepared externally using, for example, CAD software to generate a digital representation of the image (e.g., one or more graphics files in any of a variety of formats, such as a .DXF file). A digital representation of the image may also be prepared by any of a variety of other means, such as photogrammetry. For example, the Phototop™ photogrammetric templating software available from INcounters, of Abilene, Tex., may be used to generate a digital computer file having data indicative of the shape and dimensions of a countertop or other structure.

Like image files generated by computer system 41, externally-generated digital image files may be stored on a computer readable media. Suitable computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Once the digital representation of one or more images have been externally generated, they may be loaded into computer system 41 by a variety of means. For example, as shown in FIG. 2, computer system 41 may be configured to read data from a computer diskette 43 or other computer-readable media, such that the computer-readable media may be used to input one or more graphic files into computer system 41. Alternatively, or in addition thereto, image files may be transmitted to computer system 41 via a computer network (through a wired or wireless connection). Once the desired image files have been loaded into computer system 41, laser projector 31 may be instructed to project an image onto the work piece, such as stone slab S in FIG. 2. It is also contemplated that multiple image files may be stored in computer system 41 for later retrieval and use.

Once one or more image files have been created, a user may instruct computer system 41 (via an input device) to cause laser projector 31 to display an image on the work piece. When multiple image files are resident on computer system 31, the user may also select one or more of those image files and instruct the system to display the selected images on the work piece. It should be noted that computer system 41 may include one or more graphical user interface programs which facilitate the selection of image files, as well as the inputting of other instructions by the user.

In many instances, it may be desirable to project multiple images onto a work piece. For example, two (or more) countertops are often cut from one stone slab. Therefore, in the exemplary embodiment of FIG. 2, countertop outlines A and B are depicted as being traced (i.e., projected) by laser projector 31 onto stone slab S. It will also be noted that countertop outline B includes interior outline B' which represents, for example, a rectangular hole to be cut in the countertop (e.g., in order to accommodate a sink).

Outlines (i.e., images) A and B may be generated on the basis of one or two image files, such as one or two image files stored on computer-readable media 43 which is read by computer 40. When two (or more) separate image files are used, software resident on computer system 41 may be configured to facilitate not only the selection of the files by a user, but also the positioning of each image with respect to one another. If desired, such software may even be configured to generate a new, third image file including data representative of both images and their positioning with respect to one another. The two images may be stored in the new, third image file as distinct "layers," in the same manner that layers are typically employed in various graphics file formats. When a graphics file contains, for example, more than one distinct product outline (such as the outline of two or more countertops), it may be advantageous to have each such outline identified as a separate "layer" in order to facilitate the individual processing of each outline (such as the movement of individual outlines displayed on a work piece, as described further herein).

As an alternative to, or in addition to the use of layers in stored image files, image data may be stored in "blocks" by the CAD program. For example, an image file for a countertop may be defined as a block of data which includes not only the countertop outline, but also the outline for a sink opening, faucet cutouts, and any other structures or features of the countertop. In this fashion, the entire block of data defining the countertop may be processed as a unit. This will ensure, for example, that when the image of the countertop is displayed on a workpiece and the image is then moved, all of the countertop elements stored as a block will move simultaneously with one another. Of course a single image file may include both layers and blocks of data, such as an image file comprising two or more countertop images stored as distinct layers in the image file, wherein each of these layers comprises a block of data representative of not only an individual countertop outline, but also additional features or aspects such as a sink outline, faucet cutouts and the like.

When a work piece comprises a stone slab or other sheet-like material, there will often be certain features of the work piece which must be taken into account during processing. For example, stone slabs will often have grain patterns which may dictate the desired positioning of the countertop or other product to be cut from the stone. A countertop may be more aesthetically pleasing if the grain patterns extend in a certain direction. Perhaps more significantly, stone and other natural materials may include defects which often must be avoided. In the exemplary embodiment of FIG. 2, stone slab S includes such a defect, namely a fissure F. Typically, it would not be desirable for a countertop cut from slab S to include any portion of fissure F. When using physical templates to mark the stone, the operator simply moves the template to an appropriate location in order to avoid any defects, account for grain patterns in an aesthetically-pleasing manner, and/or optimize use of the entire slab (i.e., to minimize waste). Embodiments of the present invention, however, allow the operator to move the image(s) projected on the work piece to a desired location using control system 40, thereby more easily accomplishing these same purposes.

In particular, control system 40 is configured to allow the user to move the images projected onto the work piece. This may be accomplished, for example, in the same manner that CAD software and the like allows a user to move an image (or portions of an image such as a layer or block) displayed on a computer monitor. When an operator instructs computer system 41 to move the image(s) projected on the work piece, computer system 41 may be configured to transmit control signals to laser projector 31 indicative of the new image location (such as the new image coordinates). In one embodiment, this process occurs in essentially real time so that the image(s) projected on the work piece will move in conjunction with the movement instructions input to computer 40 by an operator. Such movement instructions may be input via any of a variety of conventional input devices, such as a keyboard, mouse, joystick, or even a remove input device (which may be wired or wireless).

In the embodiment shown in FIG. 2, handheld input device 45 is provided in communication with computer system 41. Input device 45 may include one or more input elements, such as one or more keys, buttons, joysticks, trackballs, rotating wheels, and the like, for providing instructions to computer system 41. In FIG. 2, exemplary input device 45 includes four buttons and a joystick for providing input to computer system 41. An operator, for example, may press one of the buttons on input device 45 to instruct computer system 41 to initiate an image movement step. Thereafter, the joystick on input device 45 is then used to move the image projected on the stone slab to a desired location (e.g., via translational movement in the X and/or Y directions and/or rotational movement). Computer system 41 receives the image movement instructions input by the user, and determines the appropriate control signals to be sent to laser projector 31. In one embodiment, computer system 41 computes new image coordinates in real time response to the movement instructions from the user, and these new coordinates are transmitted to the laser projector 31 such that the image displayed on the work piece will move in the manner intended by the user. As used herein, real time movement of the image displayed on the work piece simply means that the user perceives little or no lag in image movement (e.g., less than one second between the time a movement instruction is input by the user to the time that the image displayed on the work piece is moved).

As also seen in FIG. 2, computer system 41 may include a display device associated therewith, e.g., a monitor 48, such that the image(s) projected onto the work piece is also displayed on the monitor 48. Computer system 41 may even be configured such that the image(s) is displayed on the monitor 48 in the same orientation as projected on the work piece in order to facilitate image movement. The outline of the work surface, such as table 20, may also be displayed on monitor 48.

When two or more images are projected onto the surface of the work piece, computer system 41 may also be configured to allow for the individual movement of one or more of the images on the work piece while the other images remain stationary. In the embodiment of FIG. 2 wherein the outlines A and B of two countertops are projected onto stone slab S, for example, the operator may simply select one of the images by providing a suitable input to computer system 41 (e.g., by pressing one of the buttons on handheld input device 45 or other input device associated with computer system 41). Thereafter, the selected image may then be moved to the desired location on the work piece in the manner described previously (e.g., using the joystick on input device 45 to steer the image to the desired location). Each image may be individually moved in this same manner in order to, for example, position the images on the work piece to avoid defects in the work piece and maximize utilization of the entire work piece.

Embodiments of the present invention may also be configured such that an image selected for movement by the user is identified via visual and/or audible indicia. For example, the selected image may appear on a display device associated with computer system 41 (e.g., monitor 48) in a different color, as a brighter image, and/or in a different line style (e.g., one of the selected and non-selected image(s) are depicted using dashed or blinking lines). Alternatively, or in addition thereto, one or more visual indicators identifying the selected image may appear on the display device, such as text or other visible indicia identifying the image selected for movement. Furthermore, an audible indicator identifying the selected image may also be used alone or in combination with any of the foregoing. In addition to identifying the image(s) selected for movement on the display device such as monitor 48, the selected image(s) may also be identified on the work piece itself. Such identification on the work piece may be provided in the same manner as on monitor 48, such as displaying the selected image in a different color, as a brighter image, and/or in a different line style, or even using other visible indicia displayed on the work piece in a manner which associates such visible indicia with the selected image (such as text or symbols displayed adjacent to the image(s) selected for movement by the user).

Once the image(s) are projected on the work piece at the desired location(s), the user may signal (instruct) the completion of the image movement step to control system 40 so that the image location(s) will be "locked" in place with respect to the work piece. Such signaling or instruction may be accomplished using an input device, such as by pressing an appropriate button on handheld input device 45. Alternatively, the user may signal the completion of the image movement step simply by terminating the image movement process. This may be accomplished, for example, by the user simply indicating that the image movement step has been completed (e.g., by closing a window or screen on monitor 48 associated with the image movement step). Thereafter, as the work piece and/or work surface is moved, control system 40 will ensure that laser projector 31 projects the image(s) at the same image location(s) on the work piece. Thus, if the work piece is rotated (e.g., by rotation of the work surface supporting the work piece), the projected image(s) will also rotate through the same angle of rotation.

It is also contemplated that, even during the image movement step described above, the image(s) displayed on the work piece may move as the work piece and/or the work surface move. For example, the user may move the image(s) projected on the work piece to any desired location in the manner described previously. As part of this process, however, the user may also cause the work piece itself and/or the work surface to move (e.g., rotate) with the displayed image(s) moving in conjunction with the movement of the work piece and/or work surface (as described further herein). Furthermore, once an image(s) has been "locked" into position with respect to the work piece and/or work surface, the user may thereafter "unlock" the image(s) in order to permit further image movement, as may be desired.

Control system 40 is configured to receive data indicative of the movement of the work piece and/or the work surface, and provide revised image coordinate data to projector 31. As was the case with user-controlled image movement, control system 40 may send the appropriate control signals to projector 31 in real time response to the movement of the work piece and/or work surface. Projector 31 then retraces the image(s) based upon the control signals such that the image is projected in the same location relative to the work piece. In other words, while the projected image will move with respect to, for example, the gantry saw, it will remain stationary with respect to the work piece. In other words, the projected image will remain "in register" with the work piece despite movement of the work piece. This aspect of the present invention allows the projected image(s) to be used as a guide (or template) in the processing of the work piece (e.g., a countertop outline which an operator may use to guide the cutting of a stone slab), and eliminates the need to physically mark a pattern on the work piece.

As described further herein, laser projection system 30 is typically calibrated during an initial setup process such that control system 40 knows the precise location of the plane defined by the work surface (such as the upper surface of table 20 in FIG. 2). While embodiments of the present invention will take into account the thickness of the stone slab or other work piece positioned on the work surface, thickness data may be provided as part of the image file(s). For example, a digital representation of an image of a countertop, such as a CAD file, will typically include not only data defining the shape and planar dimensions of the countertop, but also its thickness. The user will select a stone slab of the same thickness identified in the CAD file. In this manner, since control system 40 knows the precise location of the plane of the work surface, it can easily compute the location of the plane defined by the upper surface of the stone slab. Control system 40 may then send the appropriate control signals to laser projector 31 to ensure that the countertop outline displayed on the surface of the stone slab has the exact same dimensions defined in the image file. Of course it is also contemplated that the countertop thickness need not be defined in the image file. Instead, the user may input the thickness of the stone slab into computer system 41, thereby allowing the laser projection system of the present invention to display images on the stone slab in the appropriate manner.

Once laser projection system 30 has been calibrated so that the plane of the work surface has been established, control system 40 may be configured such that images displayed on the work surface (such as stone slab S) are displayed in the exact same location on the work surface despite movement of that work surface. In order to accomplish this, the laser projection system 30 may include one or more means for sensing the movement and/or location of the work surface and/or the work piece. The sensing means provides feedback signals indicative of work surface and/or work piece movement and/or location to computer system 41. Computer system 41 will then utilize the feedback signal(s) to generate new control signals (i.e., image coordinates) which are transmitted to laser projector 31. These control signals result in a shift of the images displayed on the work piece corresponding to the movement of the work piece itself, thereby ensuring that the images remain in register with the work piece. Such sensing means may include one or more location or movement sensors configured to sense the movement or location of the work surface or the work piece. In one particular embodiment, one or more movement sensors may be attached to the processing machine in order to sense movement of the work surface and provide appropriate feedback signals to the control system.

In the exemplary embodiment of FIG. 2, table 20 is rotatably supported by base 21. Thus, table 20, along with a stone slab S positioned thereon, may be rotated about a central axis, as shown. A rotational sensor 50 may be provided in order to sense rotational movement of table 20 and provide a feedback signal indicative of that rotational movement to computer system 41. Sensor 50 may comprise, for example, a rotary encoder, a resolver, a photoelectric sensor, an electromechanical sensor, an optical sensor (such as a Doppler sensor) or any other device suitable for sensing rotational movement of table 20 and transmitting a feedback signal to computer system 41. In some embodiments, the feedback signal from sensor 50 may comprise a square or sinusoidal wave indicating rotational movement of table 20. Since the plane defined by the upper surface of stone slab S does not change, computer system 41 generates control signals in response to the feedback signal from sensor 50 such that the images displayed on stone slab S are rotated through the same angle of rotation as table 20. Once again since this image rotation may be accomplished in real time, such that the images displayed on stone slab S will, in essence, remain stationary with respect to the slab. In this manner, once the user has instructed control system 40 to "lock" the images on the work piece, the images displayed on the work piece may be used to guide the cutting or other processing of the work piece. The displayed images may be used in the exact same manner as, for example, a countertop outline physically marked on the surface of the stone slab S.

While the exemplary embodiment of FIG. 2 only depicts rotational movement of table 20, laser projection systems according to the present invention may also be configured to accommodate translational movement of table 20 (i.e., in the X and Y directions), or even tilting movement of table 20. In the same manner as described above, one or more sensors for detecting movement of the work surface and/or the work piece may be employed to generate feedback signals to computer system 41, and computer system 41 will utilize the feedback signals to generate the appropriate control signals for laser projector 31 to ensure that the displayed images move in conjunction with movement of the work piece.

Laser projector 31, or a second laser projector, may also be employed for sensing movement of the work piece and/or work surface. For example, one or more reflective targets may be positioned on the work surface at known locations. Laser projector 31 may then periodically scan work surface 20 in order to detect the location of the target(s). Laser projector 31 and the targets may be configured such that when the laser beam strikes the target, the beam is reflected back to the laser projector 31 which includes one or more sensors (e.g., a photodiode) for detecting reflected beams. Laser projector 31 transmits feedback signals indicative of movement of the work surface to computer system 41. These feedback signals may then be used in the same manner as described previously.

As yet another alternative, one or more sensors may be positioned at known locations on the work surface. Once again laser projector 31 may periodically scan the work surface. When the laser beam strikes one of the sensors positioned on the work surface, a feedback signal is transmitted back to computer system 41 for use in the same manner described previously. When movement of the work piece and/or work surface is to be detected by use of a scanning laser beam, it may be desirable to provide a second laser projector dedicated for such purpose. In this manner, one laser projector is devoted to projecting images onto the work piece, while the other is dedicated to sensing movement of the work piece and/or work surface. In this manner, the images displayed on the work surface are less likely to flicker.

Some embodiments of the present invention also provide the added benefit of facilitating alignment of a processing tool (such as saw blade 11) with portions (such as line segments) of images displayed on a work piece. In the embodiment of FIG. 2, laser projection system 30 is configured to provide operator-perceivable indicia when one or more line segments of an image displayed on the work piece are parallel to the linear cutting path of saw blade 11 (i.e., parallel to the X axis shown in FIG. 2). Such indicia may be visible and/or audible. Audible indicia may include, for example, tones, beeps, pre-recorded verbal messages, and the like. Visible alignment indicia may take many forms, and may be provided on a display device (such as monitor 48), on the work piece, on the work surface, or on any of a variety of other locations easily observable by an operator (e.g., one or more lights of varying colors positioned in a convenient location).

Visible indicia displayed on a display device such as monitor 48 may comprise one or more of the various examples mentioned previously for identifying a selected image during the image movement process. However, during the alignment step, such visible indicia may only identify the line segment of a particular image which is aligned with the saw blade. For example, in the case of a countertop outline, such visible indicia may only be provided with respect to one edge of the countertop outline which is aligned with the saw blade. By way of further example, the aligned edge of the countertop outline may be displayed on monitor 48 in a different color than the non-aligned edges of the countertop. Alternatively, or in addition thereto, the aligned edge or line segment may be displayed as a brighter line, as a dashed (or broken) line, as a blinking line, or in conjunction with other visible indicia suitable for identifying the aligned edge.

The user-perceivable indicia of alignment feature of embodiments of the present invention is significant in that it greatly simplifies the cutting process. For example, once the image(s) has been moved to the desired location on the work piece and "locked" in place by the user, the work surface (such as table 20) may then be rotated until the operator perceives an indicia that a line segment of the image outline is aligned with the saw blade. Once that indicia has been perceived, the operator may then simply move the saw blade into position (such as by moving saw bridge in the Y direction) and actuate the saw blade in order to cut the work piece along the aligned line segment. In the embodiment of FIG. 2, the rotational movement of table 20 may even be motorized and automated such that control system 40 will cause table 20 to rotate until one of the line segments is aligned with the saw blade.

In addition to, or as an alternative to, providing visible indicia on monitor 48, visible alignment indicia may also be provided by laser projector 31. For example, when control system 40 determines that a line segment forming the outline of an image displayed on the work piece is aligned with saw blade 11 (such as line segment A' in FIG. 2), control system 40 may instruct laser projector 31 to display this line segment brighter than the non-aligned line segments, as a blinking line, and/or as a dashed (or broken) line. When laser projector 31 is configured to display multiple colors, or when more than one laser projector is employed, the aligned line segment of the image outline may also be displayed in a different color than the non-aligned line segments. As yet another alternative, the aligned line segment may be displayed as a continuous line, whereas the non-aligned line segments blink. In still another embodiment, the visible indicia of alignment may be provided by varying the blinking speed of a line segment. For example, the aligned line segment of the image outline may blink at a faster or slower rate as compared to the non-aligned line segments.

Further embodiments of the present invention may also provide visible and/or audible indicia to the operator which indicate the degree of alignment for particular line segments. Control system 40 may be configured to identify to the operator those line segments which are most closely aligned with the saw blade, and provide a visible and/or audible indicia which indicates the amount of deviation from alignment with the saw blade. For example, control system 40 may identify a particular line segment which deviates from alignment with saw blade 11 by an amount equal to or less than a predetermined degree (or which is the line segment nearest an alignment) by instructing laser projector 31 to display that line segment in a blinking fashion. As the operator rotates table 20, the speed of blinking of that line segment may change in order to indicate to the operator if that line segment is becoming nearer to or further from alignment with saw blade 11 (for example, the rate of blinking may increase as the line segment approaches alignment).

The color of the line segment may even change as it approaches alignment. For example, control system 40 may instruct laser projector 31 to display the outline of a countertop in red. As the operator rotates table 20, a line segment of that outline which begins to approach alignment with saw blade 11 may be displayed in a different color, or even a different shade of a particular color. Thus, as table 20 is rotated, a line segment may change from red to yellow to green, as it becomes aligned with saw blade 11.

It is also contemplated that a second user-perceivable alignment indicia may be provided when a line segment is both parallel to the linear cutting direction of the saw blade (i.e., parallel to the X-axis) and is coextensive with the linear cutting direction of the saw blade (i.e., the saw bridge has moved in the Y-direction such that the line segment is coextensive with the linear cutting path of the saw blade). Any of the previously-described indicia may be used for this purpose.

Line laser 15 may also be used to indicate that a line segment is both parallel to and coextensive with the linear cutting path of the saw blade. In particular, if the color of laser line L projected by line laser 15 is different than the color of a line segment of an image displayed on the work piece, the operator will perceive a color shift when laser line L and the line segment of the image are coextensive. For example, if laser line L is red, and an image displayed on the work piece is green, any line segment of that image which is coextensive with laser line L (i.e., aligned in both the X and Y directions) will appear yellow on the work piece. This additional alignment feature may be used in conjunction with one or more of the alignment indicating features described above. In this manner, the color shift caused by the overlap of line laser L and a line segment of the image, will indicate to the operator that the table 20 has been rotated the proper amount so that the line segment is parallel to the saw blade, but also that the saw bridge 12 has been moved the appropriate amount in the Y direction so that the saw blade may be used to precisely cut along the line segment.

Control system 40 may determine the alignment of a line segment of an image with respect to a processing tool such as saw blade 11 in a variety of manners. In the exemplary embodiment of FIG. 2, laser projection system 30 may be calibrated such that the X/Y coordinate system for projected images is cohesive with the X/Y coordinates for gantry saw 10. The planar upper surface of table 20 defines the Z-axis of this coordinate system. (For this reason, in this particular embodiment of the present invention, the actual position of table 20 and the location of stone slab S on table 20 are not significant, and there is no need to establish, for example, a home or starting position for table 20).

In this coordinate system, the X-axis is defined as the linear direction of travel of the saw along saw bridge 12, and this corresponds to the cutting line of saw blade 11. The Y-Axis extends parallel to transverse support beams 13 and corresponds to the line of travel of saw bridge 12 along support beams 13. The 0,0,0 point of this X/Y/Z coordinate system may be defined as any of a variety of locations, such as the center of rotation of table 20 in the plane defined by the upper surface of table 20. Unless table 20 is configured for tilting, the Z coordinates of any point of an image displayed on a work piece will correspond to the thickness of the work piece (such as the thickness of a stone slab S on table 20). Control system 40 provides control signals to projector 31 indicative of the coordinates of an image in this X/Y/Z coordinate system. During the image movement step, control system 49 simply computes a new image position in response to image movement instructions input by the operator and sends new image coordinate data to projector 31. Once the image(s) have been "locked" into position on the work piece, table 20 is moved (such as rotational movement about the center point of the table). Control system 49 receives feedback signals indicative of the movement of table 20, such as feedback signals indicative of the angle of rotation of table 20 about its center point. In response, control system 49 will compute a new image position by rotating the image in the coordinate system by this same angle of rotation about the 0,0,0 point (keeping the Z coordinate at a constant value equal to the thickness of the slab). The new coordinate data is then sent to projector 31 such that the image(s) are displayed on the work piece at the previously "locked" image location. For alignment purposes, during the table movement process the control system will simply evaluate each new image position and determine whether or not any of the plurality of line segments of the image at that new position are parallel to the X-axis of the coordinate system (i.e., parallel to the saw). If parallelity is detected, then the control system will cause the appropriate indicia to be activated or displayed (e.g., by instructing the projector to display the aligned line segments in a different color or line style).

For setup and calibration purposes, the laser projection system may be "taught" the coordinate system in a variety of manners known to those skilled in the art. It is simply necessary that the laser projection system knows the plane that the work piece will rest upon (defines the Z axis), and knows the X and Y coordinates of the gantry saw. Once setup and calibration is completed, it will typically only be necessary to repeat this process at periodic intervals. There is no need for a separate calibration process for each and every work piece.

It is also contemplated that, after the image movement process has been completed to the satisfaction of the operator, computer system 41 may create an image file comprising a digital representation of the images and their position relative to one another and even relative to the work piece and/or work surface. One advantage of doing so is that this new image file may be created in a format suitable for use by a CNC router or other automated machining device to allow for the automated machining of the work piece. Thus, the laser projection system of the present invention may be used in conjunction with a CNC router to allow the operator to project one or more images (e.g., countertop outlines) on a work piece such as a stone slab positioned on the table of a CNC router. The operator may then move the images displayed on the work piece in the manner described herein to any desirable location an orientation on the work piece. Once the desired image location is achieved and the images are "locked" in place, computer system 41 will instruct the CNC router to machine the work piece following the outline of the displayed images. It may accomplish this instruction step, for example, by generating a new image file (or other instruction set) containing data representing the location and orientation of the images on the work piece or with respect to the work surface. This new image file or instruction set is then transmitted or otherwise provided to the CNC router where it is used to direct the machining of the work piece.

Figure 3:
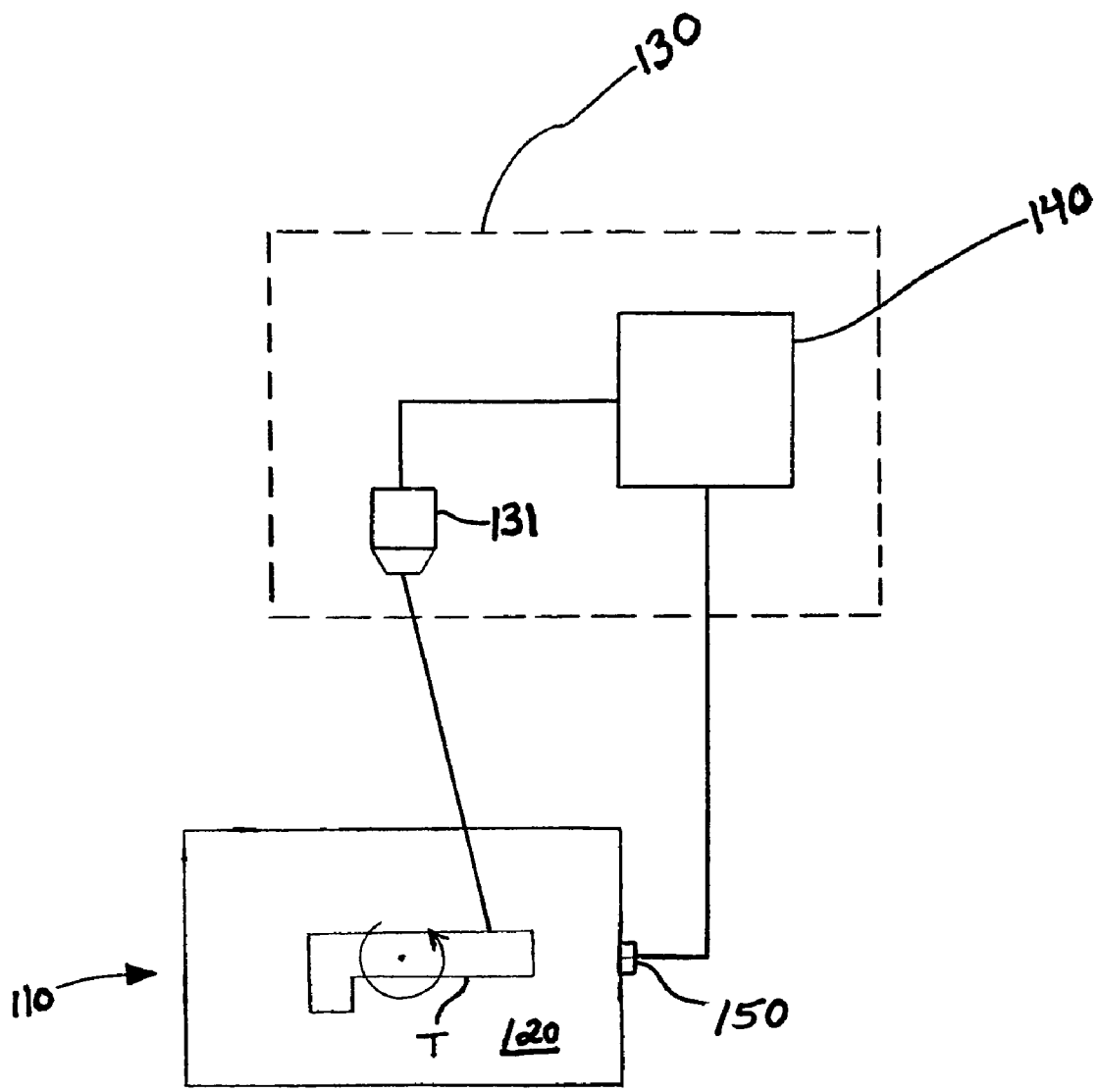
FIG. 3 is a schematic illustration of an alternative embodiment according to the present invention.

FIG. 3 depicts an alternative embodiment of a system according to the present invention for displaying one or more images (e.g., image "T") on a work surface. In particular, one or more images may be projected onto work surface 120 of a processing station 110. Work surface 120 may simply comprise the upper surface of a moveable table, and therefore work surface 120 may correspond to work surface 20 in the previous embodiment.

In the embodiment of FIG. 3, image(s) are projected (i.e., displayed) on work surface 120 rather than onto a work piece supported thereon. This system may be used, for example, to display a template for assembling a structure or placing items on work surface 120 in accordance with the projected image(s). By way of specific example, the embodiment of FIG. 3 may be used to display a template for a prestressed concrete bed, specifically the placement of forms such as windows, doors, attachment plates, and the like inside the forming bed. In essence, the system of FIG. 3 may operate in the same manner as described previously with respect to the embodiment of FIGS. 1 and 2, with the difference being that the images are displayed on the work surface rather than a work piece positioned on the work surface. One or more sensors 150 may be provided as described previously, and optical projection system 130 including an optical projector 131, and a control system 140 may also be provided, as previously discussed.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed is:

1. A method of displaying an image on a work piece positioned on a movable work surface, comprising:
   (a) providing a digital representation of an image and a laser projection system configured to project said image based on said digital representation;
   (b) providing a work piece positioned on a movable work surface;
   (c) projecting said image from said laser projection system onto said work piece at a selected image location on the work piece;
   (d) moving said work surface, with said work piece supported by said work surface;
   (e) sensing the movement of said work surface and transmitting to said laser projection system a feedback signal indicative of said movement; and
   (f) moving said projected image in response to said feedback signal such that said image is projected on the work piece at said selected image location.

2. A method of processing a work piece, comprising the steps of:
   (a) projecting an image onto a work piece to be processed;
   (b) moving at least one of said image and said work piece until said image is positioned at a desired location on said work piece;
   (c) locking said image and said work piece such that, as said work piece is moved, said image will remain at said desired location; and
   (d) processing said work piece using said image as a guide.

3. A method of displaying an image on a moveable work surface, comprising:
   (a) providing a digital representation of an image and a laser projection system configured to project said image based on said digital representation;
   (b) providing a movable work surface;
   (c) projecting said image from said laser projection system onto said work surface at a selected image location on the work surface;
   (d) moving said work surface;
   (e) sensing the movement of said work surface and transmitting to said laser projection system a feedback signal indicative of said movement; and
   (f) moving said projected image in response to said feedback signal such that said image is projected on the work surface at said selected image location.

4. A system for machining a work piece in accordance with at least one image projected onto the work piece, comprising:
   (a) a processing machine having a moveable work surface configured for supporting a work piece thereon, said processing machine configured for machining a work piece supported on said work surface;
   (b) an optical projection system for projecting at least one image onto a work piece supported by said work surface, said optical projection system including an optical projector and a control system;
   (c) at least one sensor for sensing movement of said work surface, wherein said at least one sensor is configured to provide a signal to said control system indicative of movement of said work surface;

wherein said optical projection system is configured such that an image projected onto a work piece will be projected in the same location on the work piece when said work surface is moved.

* * * * *